United States Patent [19]

Häfner

[11] Patent Number: 4,827,240
[45] Date of Patent: May 2, 1989

[54] FORCE MEASURING DEVICE

[75] Inventor: Hans W. Häfner, Aichach, Fed. Rep. of Germany

[73] Assignee: Pfister GmbH, Augsburg, Fed. Rep. of Germany

[21] Appl. No.: 81,673

[22] Filed: Aug. 5, 1987

[30] Foreign Application Priority Data

Aug. 6, 1986 [DE] Fed. Rep. of Germany ....... 3627127

[51] Int. Cl.[4] ............................................... G01L 1/22
[52] U.S. Cl. .......................................... 338/2; 338/4; 338/5; 338/32 H
[58] Field of Search .......................... 338/42, 2, 3, 4, 5, 338/32 H

[56] References Cited

U.S. PATENT DOCUMENTS 4,340,877 7/1982 Herden ................................. 338/42

FOREIGN PATENT DOCUMENTS 1129317 9/1962 Fed. Rep. of Germany .
3238951A1 4/1984 Fed. Rep. of Germany .

*Primary Examiner*—E. A. Goldberg
*Assistant Examiner*—M. M. Lateef
*Attorney, Agent, or Firm*—Lowe, Price, LeBlanc, Becker & Shur

[57] ABSTRACT

A force measuring device includes a rigid base plate and a first diaphragm symmetrical about a central normal axis and arranged in spaced parallel relationship to the base plate. An elastic connection between the base plate and a peripheral rim of said first diaphragm hermetically closes a cavity formed between the base plate and first diaphragm. A first projection is formed, for force introduction to the device, on an outer surface of the first diaphragm and extends along the central normal axis; a second projection extends from an inner surface along the central normal axis toward the base plate. A displacement sensor is arranged in the cavity between the base plate and second projection for sensing any displacement therebetween upon force application to the device, to generate an electrical signal indicative of the force applied.

28 Claims, 1 Drawing Sheet

FORCE MEASURING DEVICE

FIELD OF THE INVENTION

The invention relates to a force measuring device and, in particular, to a force measuring device using at least one diaphragm and at least one displacement sensor for detecting any displacement of the diaphragm in response to a force applied thereto.

BACKGROUND OF THE ART

Known force measuring devices using diaphragms comprise a circular base plate to the peripheral rim thereof an elastic diaphragm is bending elastically fixed, the diaphragm being provided with a force introduction projection at its top surface at a central position. For force measurement, strain gauges are provided on the surface of the diaphragm at locations undergoing strongest bending. The fixing of the strain gauges to the surface of the diaphragm is complicated; furthermore, the strain gauges are sensitive to environmental influence and the signal generated is relatively weak.

In the German Patent Publication No. 1,129,317 a force measuring device is disclosed which uses a displacement sensor inductively operating for sensing a displacement of a diaphragm by means of a feeler. The diaphragm is fixed around its periphery to a rigid ring attached to the base plate. The diaphragm has a quite specifically varying thickness in radial direction. Thus, it is difficult to manufacture. Apparently, the inductive sensor shown needs a relatively large displacement of the diaphragm in order to generate a reliable signal. Therefore, specific measures are necessary to compensate a change in gas pressure within cavity formed between the diaphragm, the ring and the base plate. Since the base plate is fixed to the ring by screws there is no elasticity in this connection. Consequently, the device is rather sensitive against lateral forces.

U.S. Pat. No. 4,340,877 discloses a pressure transducer for providing an electrical signal representative of a pressure applied to the interior of an aneroid capsule, at least one wall thereof comprising a diaphragm. In the centre of the diaphragm a magnet is mounted opposite to a Hall-IC. A changing pressure changes the distance between the magnet and the Hall-IC in direction of a central axis of the transducer. With the known pressure transducer a separate supporting structure is necessary for mounting the Hall-IC and its associated circuits outside the cavity forming the aneroid capsule. To protect the Hall-IC and its associated circuits the whole arrangement is further enclosed in a housing. There is no possibility to use this pressure transducer for measuring forces acting upon the transducer.

The German Laid Open Publication No. 32 38 951 discloses a force measuring device using two diaphragms provided with strain gauges. The two diaphragms are connected in series by being fixed to a central bolt in parallel spaced relationship to each other. Furthermore, the two diaphragms are clapmed around their peripheries. The movement of the central bolt upon force application thereto in the direction of a central axis is limited by an abutment provided on the interior bottom side of a potlike housing.

SUMMARY OF THE INVENTION

It is an object of the present invention to provide a force measuring device of simple and compact design.

It is a further object of the present invention to provide a force measuring device having all sensitive elements protected in a very simple manner.

It is a further object of the present invention to provide a force measuring device particularly insensitive against lateral forces.

It is a further object of the present invention to provide a force measuring device permitting an easy compensation of nonlinearities and temperature influences.

It is a further object of the present invention to provide a force measuring device generating large signals in dependence on forces applied thereto.

These and other objects are achieved by force measuring device comprising a rigid base plate; a first diaphragm symmetrical about a central normal axis and being arranged in spaced parallel relationship to said base plate; an elastic connection between said base plate and a peripheral rim of said first diaphragm, hermetically closing a cavity between said base plate and said first diaphragm; a first projection formed for force introduction to said device on an outer surface of said first diaphragm and extending along said central normal axis; a second projection extending from an inner surface along said central normal axis toward said base plate; and a displacement sensor means arranged in said cavity between said base plate and said second projection for sensing any displacement therebetween upon force application onto said device, and generating an electrical signal indicative of the force applied.

According to another aspect of the present invention there is provided a force measuring device comprising a first diaphragm having a symmetrical form about a central normal axis; a second diaphragm of a shape similar to that of said first diaphragm arranged opposite thereto in parallel spaced relationship and hermetically connected along a circumferential rim thereof for forming a closed cavity between said first and second diaphragms; and a displacement sensor means arranged within said cavity between said first and second diaphragms for detecting the extent of relative movement between said first and second diaphragms upon force application thereonto.

According to a still further aspect of the present invention there is provided a diaphragm means for force measuring devices including a first diaphragm comprising: an outer torsion ring; an inner elastic disk elastically connected to said torsion ring along an inner upper circular line, and provided at an upper surface with a central projection for force introduction; transducer means connected to a lower surface of said elastic disk; and wherein said outer torsion ring is adapted to be elastically connected to a support element along a lower outer circular line.

BRIEF DESCRIPTION OF THE DRAWINGS

FIG. 1 shows a force measuring device or force transducer 10 having a box-like shape and comprising a rigid base plate 12 and a resilient diaphragm 14, provided on its upper side in the centre thereof with a force introduction knob 16 having a spherically formed top surface. The knob 16 continues into the interior of the force transducer as a force receiving bolt 20 the lower end surface thereof forming a narrow gap 21 with the upper surface of the base plate 12 with the force transducer 10 in unloaded condition. At its side surface the force receiving bolt 20 is provided with an excitation element in particular a magnet 22 preferably made of somarium cobalt (SmCo). Opposite the magnet 22 and at a small distance there is provided a sensor, particularly a Hall generator 24 supported on the base plate 12 and preferably comprising Gallium Arsenide (GaAs).

Figure 1:
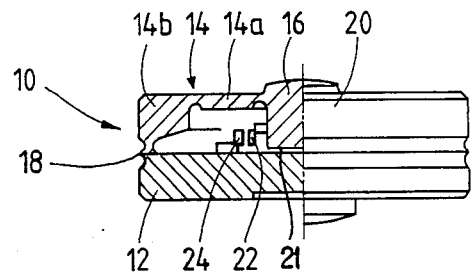
FIG. 1 is an elevational view, partially in section, of a first embodiment of a force measuring device according to the invention using one diaphragm.

The interior of the force transducer 10 is closed hermetically by a flexible connection 18 between the periphery 18 of the diaphragm 14 and the base plate 12, the flexible or bending-elastical connection 18 being made by welding or bonding.

In operation, a force acting against knob 16 results in a bending of the diaphragm 14, moving the force receiving bolt 20 toward the base plate 12. Since the magnet 22 changes its position as well, the Hall generator 24 generates a voltage signal which is transmitted via conductors (not shown) to an evaluation device of any well-known type for conversion into a value corresponding to the force measured and displayed in any suitable manner. Overloading of the force transducer 10 is prevented by the end surface of the force receiving bolt 20 abutting the top surface of the base plate 12, i.e., closure of gap 21.

Figure 2:
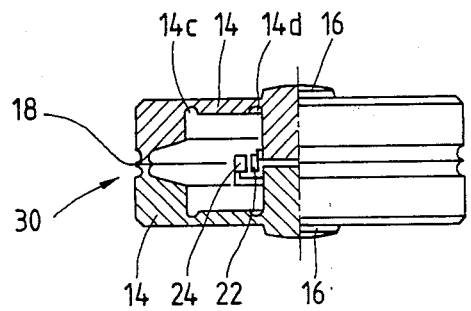
FIG. 2 is a view similar to that of FIG. 1 of a second embodiment of a force measuring device according to the invention using two diaphragms connected opposite to each other.

FIG. 2 shows a further preferred embodiment of the force measuring device of the invention comprising a box-like force transducer 30 consisting of two diaphragms 14 according to FIG. 1, arranged opposite each other. Thus, base plate 12 of FIG. 1 is replaced by the second diaphragm 14. With the force transducer 30 of this embodiment, the relative movement between the magnet 22 and the Hall generator 24 may be doubled, the Hall generator 24 being attached to the force receiving bolt 20 of the second lower diaphragm 14. Again, the two diaphragms 14 are connected along their peripheries in a flexible or bending-elastical manner by welding, bonding or the like.

Figure 3:
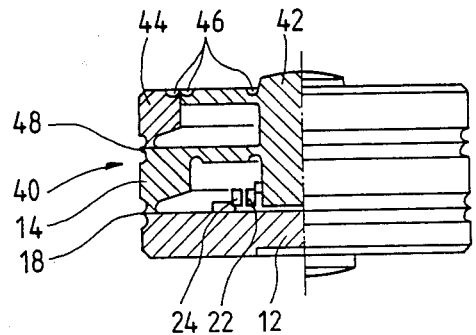
FIG. 3 is a view similar to that of FIG. 1 of a third embodiment of the force measuring device according to the invention using two diaphragms arranged on top of each other.

FIG. 3 illustrates a third embodiment of a force measuring device according to the invention providing a compensation of lateral forces acting onto the force measuring device, by arranging two diaphragms in parallel on top of each other. Specifically, a first diaphragm 14 is connected to the base plate 12 to form a combination corresponding to the force transducer 10 of FIG. 1. However, the force transducing bolt of this device is extended upward to form at its upper end surface a force introduction knob 42, and to have attached thereto a second diaphragm 44. The lower rim of the second diaphragm 44 is fixed to the upper peripheral edge of the first diaphragm 14 by a flexible connection 48 made by welding, bonding or the like.

It should be noted, that the first diaphragm 14 is provided with preferably circular grooves 14c and 14d (FIG. 2) at its lower surface for establishing a proper flexibility of the diaphragm 14.

Now, similar grooves 46 are provided on the top surface of the second diaphragm 44. Since the grooves 46 are located at the opposite surface of the diaphragm 44 as compared with the diaphragm 14 the reaction to lateral forces is just opposite for two diaphragms 14, 44. This results in a compensation of a lateral loading of the force transducer 40, if the force is applied in a direction different from the direction ot the longitudinal axis of the force transducer 40.

Figure 4:
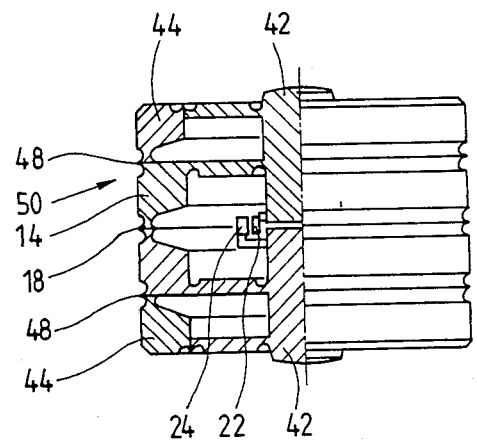
FIG. 4 is a view similar to that of FIG. 1 using four diaphragms.

FIG. 4 illustrates a fourth embodiment of a force measuring device according to the invention consisting of combining the embodiments FIGS. 2 and 3. With this force transducer 50 again the base plate 12 of FIG. 3 is replaced by a mirror-inverted arrangement of the diaphragms 14, 44 of the embodiment according to FIG. 3. This results in an increased output signal and a compensation of lateral loading of the force transducer 50.

With the embodiments explained above diaphragms have been used made of metal and being bending-elastically connected to the base plate 12 or to each other by welding. Suitable other types of connections as soldering or bonding may be used as well.

Preferably, with the embodiments a combination of a magnet and a Hall generator is used. In principle, the displacement detecting means may be applied protected against an environmental deteriorations by hermetically including them into the box-like force transducer.

Preferably, an IC-Hall element is used as a Hall generator incorporating various circuits for amplification and conversion, as it is well-known in the art. For example, a Hall generator placed in a magnetic field of a SmCo magnet generates, upon a relative displacement between the magnet and the Hall generator, a proportional output voltage of 10 mV/0.1 mm.

It should be noted, that for increasing the output signals of the force transducers of the embodiments and for a compensation of an asymmetric force introduction two or more Hall generators may be used in one force transducer, having magnets associated thereto. In particular, such sensor combination may be evenly distributed circumferentially.

It should further be noted, that the diaphragms used with the embodiments of the invention preferably have a design which may be used advantageously with other types of force measuring devices. As shown in the Figs. each diaphragm 14 comprises a relatively thin elastic central disk 14a surrounded by a torsion ring 14b much stronger or thicker than the central disk 14a. The disk 14a and the torsion ring 14b may be made of similar material. Alternatively, materials of different thermal characteristics may be used for temperature compensation. The torsion ring 14b may have a generally rectangular cross-section and is connected to the base plate 12 by the flexible connection 18 while it is flexibly connected to disk 14a at a position diagonally opposite to the connection 18. The flexible connection between this inner upper rim of the torsion ring 14b with the disk 14a is represented by the circular groove 14c (FIG. 2). Since diaphragms in general have non-linear characteristics, by means of a selection of a material for the torsion ring different from that of the disk or selecting a suitable cross-section, shape and size thereof such non-linearities may be compensated. With such a combination of a strong torsion ring 14b with a thin disk 14a the influence of lateral forces are considerably reduced.

To increase the accuracy of the force transducers according to the invention one of the two diaphragms 14, 44 of FIG. 3 may be biassed in one force direction or the two diaphragms 14, 44 may both be biassed in opposite directions.

To improve the linearity of response of the magnet/-Hall generator combination 22, 24 at least a further sensor combination may be provided in the interior of the force transducer. Specifically, the relative positions of magnet 22 and the Hall generator 24 to each other may be different for the two combinations 22, 24. Such combinations 22, 24 may be arranged in spaced relationship in the direction of the longitudinal axis of the force transducer and/or circumferentially distributed arround this axis. This measure may not only be used for improving the linearity of response of the magnet/Hall-generator combination 22, 24 but also for compensating a non-linearity of the membran(s). Alternatively, a suitable selection of the biasing of the diaphragm(s) may be used for compensating nonlinearities of the magnets/Hall generator combination(s) 22, 24.

All this means that by combining the above measures, i.e. arranging several diaphragms, suitable dimensioning and suitable material selection, the biassing thereof and a suitable set-off of the magnet 22 in respect of the Hall generator 24 of one or several combinations 22, 24 result in an excellent linearity of the force measuring device according to the invention for a very broad arrange of measurement.

While the combinations magnet/Hall generator 22, 24 have been explained to be arranged radially displaced from the central longitudinal axis of the force transducers, it should be noted, that such a combination may centrally positioned either within the force receiving bolt 20 or in the gap between the lower end surface of the force receiving bolt 20 and the upper surface of the base plate 12, if the width of the gap is suitably increased.

It should be noted, that other displacement sensor means may be used instead of a combination 22, 24.

I claim:

1. A force measuring device comprising:
   a substantially rigid base plate;
   a first diaphragm symmetrical about a central normal axis and being arranged in spaced, substantially parallel relationship to said base plate;
   an elastic connection between said base plate and a peripheral rim of said first diaphragm, said elastic connection hermetically closing a cavity formed between said base plate and said first diaphragm;
   a first projection formed for force introduction to said device on an outer surface of said first diaphragm and extending along said central normal axis;
   a second projection extending from an inner surface of said diaphragm along said central normal axis toward said base plate; and
   a displacement sensor means arranged in said cavity between said base plate and said second projection for sensing any displacement therebetween upon force application onto said device, and generating an electrical signal indicative of the force applied,
   wherein said first diaphragm comprises an outer torsion ring and an inner elastic disk elastically connected to said torsion ring along an inner upper circular line, said torsion ring being elastically connected to said base plate through said rim along a lower outer circular line.

2. The device of claim 1, wherein said displacement sensor means comprises a magnet and a Hall generator means arranged in cooperative proximity for movement relative to each other upon force application onto said device.

3. The force measuring device of claim 1, wherein said inner upper surface circular line and said lower outer circular line are grooves.

4. The device of claim 1, wherein said torsion ring has an essentially quadrangular cross-section and said inner upper and said lower outer circular lines constitute opposite edges of said torsion ring.

5. The device of claim 1, further comprising a second diaphragm arranged on top of said first diaphragm, elastically connected circumferentially with said first diaphragm, rigidly connected at a central position to said first diaphragm and provided with opposite bending elastically in respect to said first diaphragm.

6. The device of claim 1, wherein a plurality of displacement sensor means is provided.

7. The device of claim 6, wherein said plurality of displacement sensor means are arranged in spaced relationship in respect of said central normal axis.

8. The device of claim 6, wherein said plurality of said displacement sensor means are arranged at angular distances around said central normal axis.

9. The device of claim 1, wherein the torsional elasticity of said torsion ring and the bending elasticity of said elastic disk are selected such that non-linearities of the device are compensated.

10. The device of claim 1, wherein the torsional elasticity of said torsion ring and the bending elasticity of said disk are selected such that temperature influences are compensated.

11. The device of claim 1, wherein said displacement sensor means is attached to a peripheral surface of said second projection.

12. The device of claim 1, wherein said second projection has a lower end surface opposing an upper surface of said base plate at a small distance and forming an abutment to prevent overloading of said device.

13. The device of claim 1, wherein said elastic connection is a welded connection.

14. A force measuring device comprising:
   a first diaphragm having a symmetrical form about a central normal axis;
   a second diaphragm of a shape similar to that of said first diaphragm, arranged opposite thereto in substantially parallel spaced relationship and hermetically connected along a circumferential rim thereof for forming a closed cavity between said first and second diaphragms; and
   a displacement sensor means arranged within said cavity between said first and second diaphragms for detecting the extent of relative movement between said first and second diaphragms upon force application thereonto,
   wherein said first and second diaphragms comprise an outer torsion ring and an inner elastic disk elastically connected to said torsion ring along an inner upper circular line, said torsion rings of said first and second diaphragms being elastically connected to each other along a lower outer circular line.

15. The device of claim 14, wherein each of said first and second diaphragms comprise:
   a first projection formed for force introduction onto said device on an outer surface of said first and second diaphragms and extending along said central normal axis; and a second projection extending from an inner surface of said first and second diaphragms along said central normal axis, said second projections of said first and second diaphragms having end surfaces opposing each other at a small distance.

16. The device of claim 14, wherein said displacement sensor means comprises a magnet and a hall generator means arranged in cooperative proximity for movement relative to each other upon force application onto said device.

17. The device of claim 14, wherein said torsion ring has an essentially quadrangular cross-section said inner upper and said lower outer circular lines constituting opposite edges of said torsion ring.

18. The device of claim 14, further comprising a third and a fourth diaphragm arranged on top of said first and second diaphragms, respectively, elastically connected circumferentially thereto, rigidly connected to a central position thereto, and provided with opposite bending elasticity in respect thereto.

19. The device of claim 14, wherein a pluarlity of displacement sensor means is arranged at angular distances around said central normal axis.

20. The device of claim 14, wherein there is provided a plurality of displacement sensor means arranged at angular distances around said central normal axis.

21. The device of claim 14, wherein the torsional elasticity of said torsion ring and the bending elasticity of said elastic disk are selected such that non-linearities of the device are compensated.

22. The device of claim 14, wherein the torsional elasticity of said torsion ring and the bending elasticity of said disk are selected such that temperature influences are compensated.

23. In a force measuring device including a first diaphragm, the improvement comprising said diaphragm including:
an outer torsion ring;
an inner elastic disk elastically connected to said torsion ring along an inner upper circular line, and provided at an upper surface with a central projection for force introduction;
transducer means connected to a lower surface of said elastic disk; and
wherein said outer torsion ring is adapted to be elastically connected to a support element along a lower outer circular line.

24. The diaphragm of claim 23, wherein said torsion ring has an essentially quadrangular cross-section said inner upper and said lower outer circular lines constituting opposite edges of said torsion ring.

25. The diaphragm of claim 23, wherein the torsional elasticity of said torsion ring and the bending elasticity of said elastic disk are selected such that non-linearities of the device are compensated.

26. The diaphragm of claim 23, wherein the torsional elasticity of said torsion ring and the bending elasticity of said disk are selected such that temperature influences are compensated.

27. The diaphragm of claim 23 further comprising a second diaphragm arranged on top of said first diaphragm, elastically connected circumferentially with said first diaphragm, rigidly connected at a central position to said first diaphragm, and provided with opposite bending elasticity with respect to said first diaphragm.

28. A force measuring device, comprising a first diaphragm including an outer torsion ring and an inner elastic disk elastically connected to said torsion ring by means defining a flexible connection between said ring and disk;
mountng means attached to said diaphragm through said torsion ring by second flexible connection means and extending generally parallel to said diaphragm, for defining a hermetically closed cavity between said diaphragm and mounting means;
a first projection formed on an outer surface of the diaphragm disk to transmit a force exerted against the first projection to said device;
a second projection extending from an inner surface of said diaphragm disk towards said mounting means; and
displacement sensor means arranged in said cavity between said mounting means and said second projection for sensing displacement therebetween induced by application of said force against said first projection, said displacement sensor means generating an electrical signal indicative of said force applied to the first projection.

* * * * *